United States Patent
Li et al.

(10) Patent No.: US 6,372,853 B1
(45) Date of Patent: Apr. 16, 2002

(54) BUTADIENE/ISOPRENE/MONOVINYL AROMATIC MONOMER HEPTABLOCK COPOLYMERS AND METHOD FOR THE PREPARATION THEREOF

(75) Inventors: Yang Li; Dingyi Hong, both of Beijing; Mingchu Gu, Liaoning; Jinzong Yang, Liaoning; Yurong Wang, Liaoning; Hongde Xu, Beijing; Xingjun Lu, Beijing; Zhanxia Lv, Beijing; Yongjun Lu, Beijing; Yuchun Song, Beijing, all of (CN)

(73) Assignees: China Petrochemical Corporation; Research Institute of Beijing Yanshan Petrochemical Co., Ltd., both of Beijing (CN)

( * ) Notice: Subject to any disclaimer, the term of this patent is extended or adjusted under 35 U.S.C. 154(b) by 0 days.

(21) Appl. No.: 09/627,105

(22) Filed: Jul. 27, 2000

(30) Foreign Application Priority Data

Jul. 28, 1999 (CN) ............................................. 99111139
Jul. 28, 1999 (CN) ............................................. 99111140

(51) Int. Cl.$^7$ ............................................. C08F 297/04
(52) U.S. Cl. ........................ 525/314; 525/271; 526/173
(58) Field of Search ................................ 525/271, 314; 526/173

(56) References Cited

U.S. PATENT DOCUMENTS

| | | | |
|---|---|---|---|
| 4,122,134 A | * 10/1978 | Miki et al. ............... | 525/314 X |
| 4,386,125 A |   5/1983 | Shiraki et al. | |
| 5,130,377 A |   7/1992 | Trepka et al. | |
| 5,399,628 A | *  3/1995 | Moczygemba et al. ..... | 525/314 |
| 5,462,994 A | * 10/1995 | Lo et al. ...................... | 525/314 |
| 5,583,182 A | * 12/1996 | Asahara et al. ............. | 525/314 |
| 5,780,551 A |   7/1998 | Engel et al. | |
| 6,031,053 A | *  2/2000 | Knoll et al. ................. | 525/314 |

FOREIGN PATENT DOCUMENTS

EP         413294 A2     2/1991

* cited by examiner

Primary Examiner—Fred Teskin
(74) Attorney, Agent, or Firm—Ladas & Parry

(57) ABSTRACT

The present invention relates to butadiene/isoprene/monovinyl aromatic monomer heptablock copolymers having the following symmetric structure:

Z-XZ-X-Y-X-XZ-Z wherein Z represents a polymer block of monovinyl aromatic monomer, X and Y, being different from each other, represent polymer blocks of butadiene or isoprene, XZ represents a tapered copolymer block of monovinyl aromatic monomer and butadiene or isoprene, and wherein the content of the recurring units derived from monovinyl aromatic monomer is 10 to 50 percent by weight, the content of the recurring units derived from butadiene is 10–75 percent by weight and the content of the recurring units derived from isoprene is 10–75 percent by weight, all based on the weight of the block copolymer, and methods for the preparation thereof.

15 Claims, No Drawings

BUTADIENE/ISOPRENE/MONOVINYL AROMATIC MONOMER HEPTABLOCK COPOLYMERS AND METHOD FOR THE PREPARATION THEREOF

The present invention relates to butadiene/isoprene/monovinyl aromatic monomer heptablock copolymers and methods for the preparation thereof, More particularly, the present invention relates to block copolymers having the following symmetric structures: Z-XZ-X-Y-X-XZ-Z, wherein Z represents a polymer block of monovinyl aromatic monomer, X and Y, being different from each other, represent polymer blocks of butadiene or isoprene and XZ represents a tapered copolymer block of monovinyl aromatic monomer and butadiene or isoprene.

Generally, representative block copolymers based on butadiene, isoprene and styrene are SBS and SIS, with SBS being butadiene/styrene triblock copolymers (wherein B represents polybutadiene block and S represents polystyrene block), and SIS being isoprene/styrene triblock copolymers (wherein I represents polyisoprene isoprene block and S represents polystyrene block). By employing difunctional lithium based initiators and changing the charging orders of butadiene, isoprene and styrene, block copolymers having various different structures can be obtained. Such block copolymers comprise those having the following symmetric structures: (1) S-I-BI-B-BI-I-S(with butadiene and isoprene being charged all at once and then styrene being separately charged); (2)S-I-B-I-S(with butadiene, isoprene and styrene being charged in that order), as disclosed in EP-0 413 294A2; (3) S-B-I-B-S(with isoprene, butadiene and styrene being charged in that order).

The object of the present invention is to prepare multi-block copolymers based on butadiene, isoprene and monovinyl aromatic monomers, such multiblock copolymers possessing the excellent properties of both SBS and SIS, for example, excellent tensile strength, elongation at break and the like, and being thermoplastic elastomeric materials having various utilities. After being hydrogenated, such multi-block copolymers can be used for preparing heat-sensitive adhesives and pressure-sensitive adhesives, and provide advantages to which general SBS's and SIS's are incomparable.

The present invention, it one aspect, provides a family of butadiene/ isoprene/monovinyl aromatic monomer heptablock copolymers, with the single monomer usually used for forming B blocks in conventional SBS's or I blocks in conventional SIS's being replaced by two monomers, i.e. butadiene and isoprene, and moreover, I blocks or B blocks existing together with BS or IS tapered copolymer blocks.

The present invention, in another aspect, provides a method for preparing the above heptablock copolymers, characterizing by firstly substantially completely polymerizing one monomer of butadiene and isoprene by using difunctional lithium based initiators, then charging a mixture consisting of the other monomer of butadiene and isoprene and monovinyl aromatic monomers into the resulting living polymer and substantially completely polymerizing them.

The butadiene/isoprene/monovinyl aromatic monomer heptablock copolymers in accordance with the present invention have the following symmetric structures: Z-XZ-X-Y-X-XZ-Z, wherein Z represents a polymer block of monovinyl aromatic monomer, X and Y, being different from each other, represent polymer blocks of butadiene or isoprene and XZ represents a tapered copolymer block of monovinyl aromatic monomer and butadiene or isoprene, and wherein the content of the recurring units derived from monovinyl aromatic monomers is 10 to 50 percent by weight, preferably 20 to 40 percent by weight, based on the weight of the block copolymer, the content of the recurring units derived from butadiene is 10–75 percent by weight, preferably 20 to 50 percent by weight, based on the weight of the block copolymer and the content of the recurring units derived from isoprene is 10–75 percent by weight, preferably 20 to 50 percent by weight, based on the weight of the block copolymer.

Preferably, the butadiene/isoprene/monovinyl aromatic monomer heptablock copolymers in accordance with the present invention have a number-average molecular weight (Mn, determined by Gel Permeation Chromatographic (GPC) method) of $5 \times 10^4$ to $50 \times 10^4$, more preferably $10 \times 10^4$ to $30 \times 10^4$, and most preferably $10 \times 10^4$ to $25 \times 10^4$.

In the butadiene/isoprene/monovinyl aromatic monomer heptablock copolymers in accordance with the present invention, the content of 1,2-polybutadiene structure is typically from 6 to 35 percent by weight, preferably from 10 to 20 percent by weight, based on the weight of polybutadiene block and the content of 3,4-polyisoprene structure is typically from 6 to 35 percent by weight, preferably from 10 to 20 percent by weight, based on the weight of polyisoprene block. There is no particular restriction with respect to the manners for controlling the contents of 1,2-polybutadiene structure and 3,4-polyisoprene structure within the above ranges, respectively, and they can be achieved simply by polymerizing said monomers in non-polar hydrocarbon solvents by conventional anionic polymerization processes. In this regard, for example, J. Fetters et. al. disclosed, in Adv. In Polymer Sci., 56, 28(1984), that when employing alkyl lithium as initiator to polymerize isoprene in non-polar solvents, the resulting polyisoprene has the following microstructures: 3,4-addition structures are about 5 to 8 percent, and the remainders are predominantly cis-1,4-addition structures, together with small amounts of trans-1,4-addition structures, depending on the type of solvent and the polymerization temperature used. Polybutadiene usually has three structures, i.e. cis-1,4-, trans-1,4- and 1,2-addition structures, and when butadiene is polymerized in non-polar solvents by employing alkyl lithium as initiator, the resulting polybutadiene has a low content of 1,2-addition structures, typically about 10%.

The monovinyl aromatic monomers which are preferred in the present invention includes styrene or alkyl substituted styrene such as vinyl toluene(all isomers, alone or in admixture), α-methylstyrene, 4-tertiary-butylstyrene, 4-methylstyrene, 3,5-diethylstyrene, 3,5-di-n-butylstyrene, 4-(4-phenyl-n-butyl) styrene, 2-ethyl4-benzylstyrene, 4-cyclohexylstyrene, 4-n-propylstyrene, 4-dodecylstyrene and mixtures thereof. More preferable monovinyl aromatic monomers are styrene, vinyltoluene, α-methylstyrene and mixtures thereof, with styrene being most preferred.

In the method for preparing the heptablock copolymers in accordance with the present invention, the polymerization of the foregoing monomers is conducted according to well known anionic polymerization conditions. Suitably, the monomers are polymerized in a solvent at a temperature of 20° C. to 90° C., preferably 30° C. to 80° C. Suitable solvents include non-polar hydrocarbon solvents, selected from the group consisting of non-polar aromatic hydrocarbons, non-polar aliphatic hydrocarbons and mixtures thereof. Examples of solvents include benzene, toluene, ethylbenzene, xylene, pentane, hexane, heptane, octane, cyclohexane, mixed xylene, raffinate oil or mixtures thereof. In the method according to the present invention, the concentration of the monomer to be firstly polymerized, either butadiene or isoprene, in the solvent used is preferably from 10 to 20 percent by weight.

In the method for preparing the heptablock copolymers in accordance with the present invention, the amount of the monovinyl aromatic monomer used is from 10 to 50 percent by weight, preferably from 20 to 40 percent by weight, based on the total weight of the monomers; and the amounts of butadiene and isoprene used are from 10 to 75 percent by weight, preferably from 20 to 50 percent by weight, respectively, based on the total weight of the monomers.

The initiator useful in the present invention is difunctional lithium based initiators, selected from the group consisting of bislithiums derived from dihalogenated alkanes and oligomeric bislithiums thereof, having the general formulae LiRLi and Li(DO)nR(DO)nLi, respectively, wherein R represents alkyl groups having from 4 to 10 carbon atoms, DO represents a conjugated diene having from 4 to 8 carbon atoms or mixtures thereof, with 1,3-butadiene and isoprene being preferred and n represents the oligomerization degree, typically ranging from 2 to 8, preferably from 3 to 6; bislithiums of naphthalene; and bislithiums derived from diene compounds and oligomeric bislithiums thereof. Examples of bislithiums derived from dihalogenated alkanes and oligomeric bislithiums thereof include 1,4-dilithiobutane, 1,2-dilithio-1,2-diphenylethane, 1, 4-dithio-1,1,4,4tetraphenylbutane, 1,4-dilithio-1,4-dimethyl-1,4-diphenyl-butane and isoprene oligomer-bislithiums and butadiene oligomer-bislithiums thereof; examples of bislithiums of naphthalene include dilithionaphthalene and α-methyl-dilithio-naphthalene; and examples of bislithiums derived from diene compounds and oligomeric bislithiums thereof include 1,3-phenylene-bis[3-methyl-1-(4-methyl)-phenylpentylidene ]bislithium, 1,3-phenylene-bis[3-methyl-1-(4-methyl)phenylpentylidene ]butadiene oligomer-bislithium, 1,3-phenylene-bis[3-methyl-1-(4-methyl) phenylpentylidene]isoprene oligomer-bislithium, 1,4-phenylene-bis[3-methyl-1-(4-methyl) phenylpentylidene]bis-lithium, 1,4-phenylene-bis[3-methyl-1-(4-methyl) phenylpentylidene]butadiene oligomer-bislithium, and 1,4-phenylene-bis[3-methyl-1-(4-methyl) phenyl-pentylidene]isoprene oligomer-bislithium. The above initiators can be used alone or in admixture.

The amount of the initiator used depends on the desired number-average molecular weight of the block copolymers. In the present invention, the difunctional lithium based initiator is used in such an amount that the block copolymers have a number-average molecular weight of $5 \times 10^4$ to $50 \times 10^4$.

After conducting anionic polymerization as described above, it is preferred that to the resulting polymer liquid is added an antioxidant or a mixture thereof, for example a mixture of Irganox 1010(trade name, available from Ciba-Geigy AG, Switzerland) and ANTIGENE BHT(trade name, 2,6-di-tertiary-butyl-4-methylphenol, available from Sumitomo Chemical Co., Ltd., Japan) in a weight ratio of 1:1, and then the polymer liquid is post-treated by conventional manners and subjected to analysis after being dried.

The present invention is further illustrated by the following examples, which shall not be construed as limited.

EXAMPLE 1

Into a 5 liter stainless steel reactor equipped with a stirrer and a heater are added 3.5 liters of cyclohexane and 105 grams of butadiene. The reactor is heated to 50° C. and 24.6 ml(0.095M) of a difunctional lithium based initiator, 1, 3-phenylene-bis[3-methyl-1-(4-methyl)phenylpentylidene] bislithium is added thereto. The polymerization of butadiene is completed after 30 minutes. Next, to the resulting polymer liquid are added 140 grams of isoprene and 105 grams of styrene, and the reaction is continued for 60 minutes. Subsequently, 3.5 grams of antioxidant (a mixture of Irganox 1010 and ANTIGENE BHT in a weight ratio of 1:1) is added into the resulting polymer liquid, which is then subjected to post-treatment by conventional manners. After being dried, the structural and mechanical properties of the samples are measured by conventional manners and the results are shown in Table 1.

EXAMPLES 2–7

The procedure similar to example 1 is followed, except that the proportions of styrene, isoprene and butadiene are changed, so as to prepare heptablock copolymers S-IS-I-B-I-IS-S. The results obtained are shown in Table 1.

TABLE 1

Polymerization conditions and physical properties of the resulting products

| Example | 1 | 2 | 3 | 4 | 5 | 6 | 7 |
|---|---|---|---|---|---|---|---|
| S (g) | 105 | 105 | 105 | 140 | 140 | 70 | 70 |
| I (g) | 140 | 105 | 70 | 105 | 70 | 140 | 105 |
| B (g) | 105 | 140 | 175 | 105 | 140 | 140 | 175 |
| S/I/B | 3/4/3 | 3/3/4 | 3/2/5 | 4/3/3 | 4/2/4 | 2/4/4 | 2/3/5 |
| Tensile strength (MPa) | 16.5 | 17.0 | 18.8 | 22.0 | 20.7 | 14.6 | 15.8 |
| Elongation at break (%) | 1280 | 1250 | 1050 | 1060 | 980 | 1480 | 1250 |

Note: S represents the content of styrene, I represents the content of isoprene, B represents the content of butadiene and S/I/B represents the proportion of styrene/isoprene/butadiene.

EXAMPLE 8

The procedure similar to example 1 is followed, except that the charging order for butadiene and isoprene is exchanged, so as to prepare a heptablock copolymer S-BS-B-I-B-BS-S. The results obtained are shown in Table 2.

EXAMPLES 9–14

The procedure similar to example B is followed, except that the proportions of styrene, isoprene and butadiene are changed, so as to prepare heptablock copolymers S-BS-B-I-B-BS-S. The results obtained are shown in Table 2.

TABLE 2

Polymerization conditions and physical properties of the resulting products

| Example | 8 | 9 | 10 | 11 | 12 | 13 | 14 |
|---|---|---|---|---|---|---|---|
| S (g) | 105 | 105 | 105 | 140 | 140 | 70 | 70 |
| I (g) | 140 | 105 | 70 | 105 | 70 | 140 | 105 |
| B (g) | 105 | 140 | 175 | 105 | 140 | 140 | 175 |
| S/I/B | 3/4/3 | 3/3/4 | 3/2/5 | 4/3/3 | 4/2/4 | 2/4/4 | 2/3/5 |
| Tensile strength (MPa) | 18.5 | 17.0 | 16.8 | 22.0 | 20.7 | 15.6 | 14.8 |
| Elongation at break (%) | 980 | 1050 | 1200 | 1050 | 1200 | 1280 | 1350 |

Note: S represents the content of styrene, I represents the content of isoprene, B represents the content of butadiene and S/I/B represents the proportion of styrene/isoprene/butadiene.

What is claimed is:

1. A butadiene/isoprene/monovinyl aromatic monomer heptablock copolymer, having the following symmetric structure:

Z-XZ-X-Y-X-XZ-Z wherein Z represents a polymer block of monovinyl aromatic monomer, X and Y, being different from each other, represent polymer blocks of butadiene or isoprene, XZ represents a tapered copolymer block of monovinyl aromatic monomer and butadiene or isoprene, and wherein the content of the recurring units derived from monovinyl aromatic monomer is 10 to 50 percent by weight, the content of the recurring units derived from butadiene is 10–75 percent by weight and the content of the recurring units derived from isoprene is 10–75 percent by weight, all based on the weight of the block copolymer.

2. The block copolymer according to claim 1, wherein said monovinyl aromatic monomer is styrene.

3. The block copolymer according to claim 1, having a number-average molecular weight of $5 \times 10^4$ to $50 \times 10^4$.

4. The block copolymer according to claim 3, having a number-average molecular weight of $10 \times 10^4$ to $30 \times 10^4$.

5. The block copolymer according to claim 1, wherein the content of the recurring units derived from said monovinyl aromatic monomer is 20 to 40 percent by weight, the content of the recurring units derived from butadiene is 20–50 percent by weight and the content of the recurring units derived from isoprene is 20–50 percent by weight, all based on the weight of the block copolymer.

6. The block copolymer according to claim 1, wherein the polybutadiene block contains less than 35 percent by weight of 1,2-addition structure and the polyisoprene block contains less than 35 percent by weight of 3,4-addition structure.

7. The block copolymer according to claim 6, wherein the polybutadiene block contains less than 20 percent by weight of 1,2-addition structure and the polyisoprene block contains less than 20 percent by weight of 3,4-addition structure.

8. A method for the preparation of the block copolymer according to any one of claims 1 to 7, comprising polymerizing one monomer of butadiene and isoprene non-polar hydrocarbon solvent in the presence of a difunctional lithium based initiator and at a temperature of 30 to 80° C., wherein said monomer is used in an amount of 10–75 percent by weight based on the total weight of the monomers and its concentration in said solvent is 10 to 20 percent by weight, and after the polymerization of said monomer is completed, the other monomer of butadiene and isoprene and monovinyl aromatic monomer are added to the resulting living polymer all at once and are polymerized, wherein said other monomer is used in an amount of 10–75 percent by weight based on the total weight of the monomers and said monovinyl aromatic monomer is used in an amount of 10–50 percent by weight based on the total weight of the monomers.

9. The method according to claim 8, wherein said difunctional lithium based initiator is used in such an amount that the resulting block copolymer has a number-average molecular weight of from $5 \times 10^4$ to $50 \times 10^4$.

10. The method according to claim 8, wherein said difunctional lithium based initiator is one selected from the group consisting of:

bislithiums derived from dihalogenated alkanes and oligomeric bislithiums thereof, having the following general formulae:

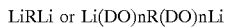

wherein R represents alkyl groups having from 4 to 10 carbon atoms, DO represents a conjugated diene having from 4 to 8 carbon atoms or mixtures thereof, n represents the oligomerization degree and ranges from 2 to 8;

bislithiums of naphthalene; and bislithiums derived from diene compounds and oligomeric bislithiums thereof, and mixtures thereof.

11. The method according to claim 10, wherein said conjugated diene represented by DO is selected from the group consisting of 1,3-butadiene and isoprene and the value of n is from 3 to 6.

12. The method according to claim 8, wherein said non-polar hydrocarbon solvent is selected from the group consisting of benzene, toluene, ethylbenzene, xylene, pentane, hexane, heptane, octane, cyclohexane, mixed xylene and raffinate oil.

13. The method according to claim 12, wherein said non-polar hydrocarbon solvent is selected from the group consisting of hexane, cyclohexane and raffinate oil.

14. The method according to claim 10, wherein said bislithiums of naphthalene are dilithionaphthalene or α-methyl dilithionaphthalene.

15. The method according to claim 10, wherein said bislithiums derived from diene compounds and said oligomeric bislithiums thereof are 1,3-phenylene-bis[3-methyl-1-(4-methyl) phenylpentylidene]bislithium, 1,3-phenylene-bis[3-methyl-1-(4-methyl) phenylpentylidene]butadiene oligomer-bislithium, 1,3-phenylene-bis[3-methyl-1-(4-methyl) phenylpentylidene]isoprene oligomer-bislithium, 1,4-phenylene-bis [3-methyl-1-(4-methyl) phenylpentylidene]butadiene oligomer-bislithium, or 1,4-phenylene-bis [3-methyl-1-(4-methyl)phenylpentylidene] isoprene oligomer-bislithium.

* * * * *